United States Patent
Katou

(10) Patent No.: US 8,411,985 B2
(45) Date of Patent: Apr. 2, 2013

(54) IMAGE PROCESSING DEVICE, IMAGE PROCESSING METHOD AND NON-TRANSITORY COMPUTER READABLE MEDIUM RECORDING IMAGE PROCESSING PROGRAM

(75) Inventor: Yusuke Katou, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 394 days.

(21) Appl. No.: 12/662,771

(22) Filed: May 3, 2010

(65) Prior Publication Data
US 2010/0329584 A1 Dec. 30, 2010

(30) Foreign Application Priority Data
Jun. 29, 2009 (JP) ................ 2009-153373

(51) Int. Cl.
G06K 9/40 (2006.01)
H04N 1/46 (2006.01)

(52) U.S. Cl. ........................ 382/266; 358/532

(58) Field of Classification Search .......... 382/254, 382/260, 266, 274–275, 305, 312; 375/240.27; 358/3.27, 296, 463, 532; 348/207.99
See application file for complete search history.

(56) References Cited

U.S. PATENT DOCUMENTS

| | | | |
|---|---|---|---|
| 6,651,082 B1 | 11/2003 | Kawase et al. | |
| 7,469,007 B2 * | 12/2008 | Tahara et al. | 375/240.02 |
| 7,542,618 B2 * | 6/2009 | Kang et al. | 382/254 |
| 7,620,259 B2 * | 11/2009 | Hosyuyama | 382/254 |
| 7,911,653 B2 * | 3/2011 | Saito | 358/3.28 |
| 8,170,118 B2 * | 5/2012 | Kitamura et al. | 375/240.26 |
| 2006/0164525 A1 | 7/2006 | Hosyuyama | |

FOREIGN PATENT DOCUMENTS

| | | |
|---|---|---|
| JP | 2000-57329 A | 2/2000 |
| JP | 2005-122257 | 5/2005 |
| JP | 2006-196992 | 7/2006 |

OTHER PUBLICATIONS

Korean Office Action dated Sep. 15, 2011, with English translation.

* cited by examiner

*Primary Examiner* — Kanjibhai Patel
(74) *Attorney, Agent, or Firm* — McGinn IP Law Group, PLLC

(57) ABSTRACT

A first exemplary aspect of the present invention is an image processing device that executes image processing including first image processing and second image processing by using a pipeline mechanism, the image processing device including: a first processing unit that executes the first image processing on an input image data, generates history information recording specifics of processing executed in the first image processing, and outputs the history information to the first processing unit; and a second processing unit that executes the second image processing on the image data obtained in the first image processing according to the output history information.

10 Claims, 10 Drawing Sheets

IMAGE PROCESSING DEVICE, IMAGE PROCESSING METHOD AND NON-TRANSITORY COMPUTER READABLE MEDIUM RECORDING IMAGE PROCESSING PROGRAM

INCORPORATION BY REFERENCE

This application is based upon and claims the benefit of priority from Japanese patent application No. 2009-153373, filed on Jun. 29, 2009, the disclosure of which is incorporated herein in its entirety by reference.

BACKGROUND

1. Field of the Invention

The present invention relates to an image processing device, an image processing method, and a non-transitory computer readable medium recording image processing program, and more particularly, to a technique that executes an image processing by an image processing pipeline.

2. Description of Related Art

An image processing device such as a digital camera or scanner executes image processing such as a correction or noise reduction on an image acquired by shooting or scanning by the image processing pipeline.

FIG. 10 shows an example of image processing using an image processing pipeline. FIG. 10 is not a "prior art" figure because it is drafted by the inventor in order to explain a problem discovered by the inventor. The image processing pipeline shown in FIG. 10 includes a linearity correction processing circuit 91, a shading correction processing circuit 92 and a noise reduction processing circuit 93. The image processing pipeline receives a pixel value of a pixel included in an image on which image processing is to be executed. The processing circuits 91, 92 and 93 execute an image processing according to a received pixel value, and output a pixel value calculated in the image processing.

The linearity correction processing circuit 91 executes the image correction processing to recover the linearity of pixel values included in an image. The image processing unit 911 of the linearity correction processing circuit 91 multiplies a received input pixel value by a coefficient according to the input pixel value. Note that the image processing unit 911 identifies the coefficient according to a linearity correction processing specification parameter indicating that degree of the linearity correction. Further, the linearity correction processing specification parameter is a predetermined arbitrarily value. The image processing unit 911 outputs a pixel value obtained by multiplying an input pixel value by a coefficient to the shading correction processing circuit 92.

The shading correction processing circuit 92 executes the image correction processing to even out the density of an image. The image processing unit 921 of the shading correction processing circuit 92 multiplies a received input pixel value by a coefficient determined for each of the x- and y-coordinates positions of pixels included an image. Note that the image processing unit 921 identifies the coefficient according to the shading correction processing specification parameter indicating the degree of the shading correction. Further, the shading correction processing specification parameter value is a predetermined arbitrarily value. The image processing unit 921 outputs a pixel value obtained by multiplying an input pixel value by a coefficient to the noise reduction processing circuit 93.

The noise reduction processing circuit 93 executes the image processing to reduce the noise of an image. The image processing unit 931 of the noise reduction processing circuit 93 calculates a pixel value that is obtained by reducing the noise from a received input pixel by the same strength for each input pixel value. Note that the image processing unit 931 identifies the strength, by which the noise is reduced, according to a noise reduction processing specification parameter indicating the degree of the noise reduction. Further, the noise reduction processing specification parameter value is a predetermined arbitrarily value. That is, the noise reduction processing is executed on all of the pixels included an image with the same strength.

The image processing pipeline shown in FIG. 10 executes the image processing for each of the pixels included an image with different strength through the linearity correction processing and the shading correction processing. Therefore, the image generated through the linearity correction processing and the shading correction processing includes a pixel for which the noise is strengthened and a pixel for which the noise is not strengthened the noise.

However, the present inventor has found a problem that the image quality of an image generated by the noise reduction processing is degraded when the noise reduction processing is executed for all of the pixels included an image with same strength in the abovementioned image processing pipeline.

Thus, more specifically, if an image is processed with the noise reduction processing with the strength tailored to a pixel having strengthened noise, a pixel having no strengthened noise is processed with the noise reduction processing with more strength than necessary. This result in a problem that the image quality of the pixel having no strengthened noise is degraded. Then, if an image is processed with the noise reduction processing with the strength tailored to the pixel having strengthened noise, a pixel having no strengthened noise is not processed with the noise reduction processing with the necessary strength. This result in a problem that the noise remains in the pixel having strengthened noise.

As described above, the image processing pipeline does not execute image processing at the subsequent stage according to the specifics of the image processing at the preceding stage. Therefore, there is a problem that the image quality of an image generated by the image processing using the image processing pipeline is degraded.

Japanese Unexamined Patent Application Publication No. 2005-122257 discloses a technique that can simplify timing control and hardware configuration, shorten the development period, and reduce costs of an image processing device. This technique can identify an image processing corresponding to the attribute of pixel data based on tag information to identify the attribute of the pixel data, and executes the image processing on image data without instructions from the sequencer that controls the entire device. However, Japanese Unexamined Patent Application Publication No. 2005-122257 does not disclose any technique to improve the image quality of an image generated by image processing using an image processing pipeline.

Japanese Unexamined Patent Application Publication No. 2006-196992 discloses a technique that can generate history information necessary for decode processing to restore a processed image obtained by image processing to an unprocessed original input image, and then restores the processed image to the unprocessed original input image based on history information. However, Japanese Unexamined Patent Application Publication No. 2006-196992 does not disclose any technique for an image processing pipeline.

SUMMARY

As explained above, the image processing pipeline does not execute image processing at the subsequent stage according to the specifics of the image processing at the preceding stage. Therefore, there is a problem that the image quality of an image generated by the image processing using image processing pipeline is degraded. Furthermore, even if any of the techniques disclosed in Japanese Unexamined Patent Application Publication Nos. 2005-122257 and 2006-196992 is applied, the abovementioned problem cannot be solved.

A first exemplary aspect of the present invention is an image processing device that executes image processing including first image processing and second image processing by using a pipeline mechanism, the image processing device including: a first processing unit that executes the first image processing on an input image data, generates history information recording specifics of processing executed in the first image processing, and outputs the history information to the first processing unit; and a second processing unit that executes the second image processing on the image data obtained in the first image processing according to the output history information.

A second exemplary aspect of the present invention is an image processing method to execute image processing including first image processing and second image processing by a pipeline scheme, the image processing method including: executing the first image processing on image data; generating and outputting history information recording specifics of processing in the first image processing; and executing the second image processing on the image data obtained in the first image processing according to the output history information.

A third exemplary aspect of the present invention is a non-transitory computer readable medium recording an image processing program that causes a processor to execute second image processing among first image processing and second image processing included in image processing executed by a pipeline scheme, the image processing program causing the processor to execute processing including: obtaining history information recording specifics of processing executed on image date in the first image processing; and executing the second image processing on the image date executed in the first image processing according to the obtained history information.

According to the abovementioned exemplary aspects, it is possible to execute image processing at the subsequent stage according to the specifics of image processing at the preceding stage. Therefore, it is possible to improve the image quality of an image generated by image processing using an image processing pipeline.

According to abovementioned exemplary aspects of the present invention, it is possible to provide an image processing device, an image processing method, and a non-transitory computer readable medium recording an image processing program that are capable of improving the image quality of an image generated by image processing using an image processing pipeline.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
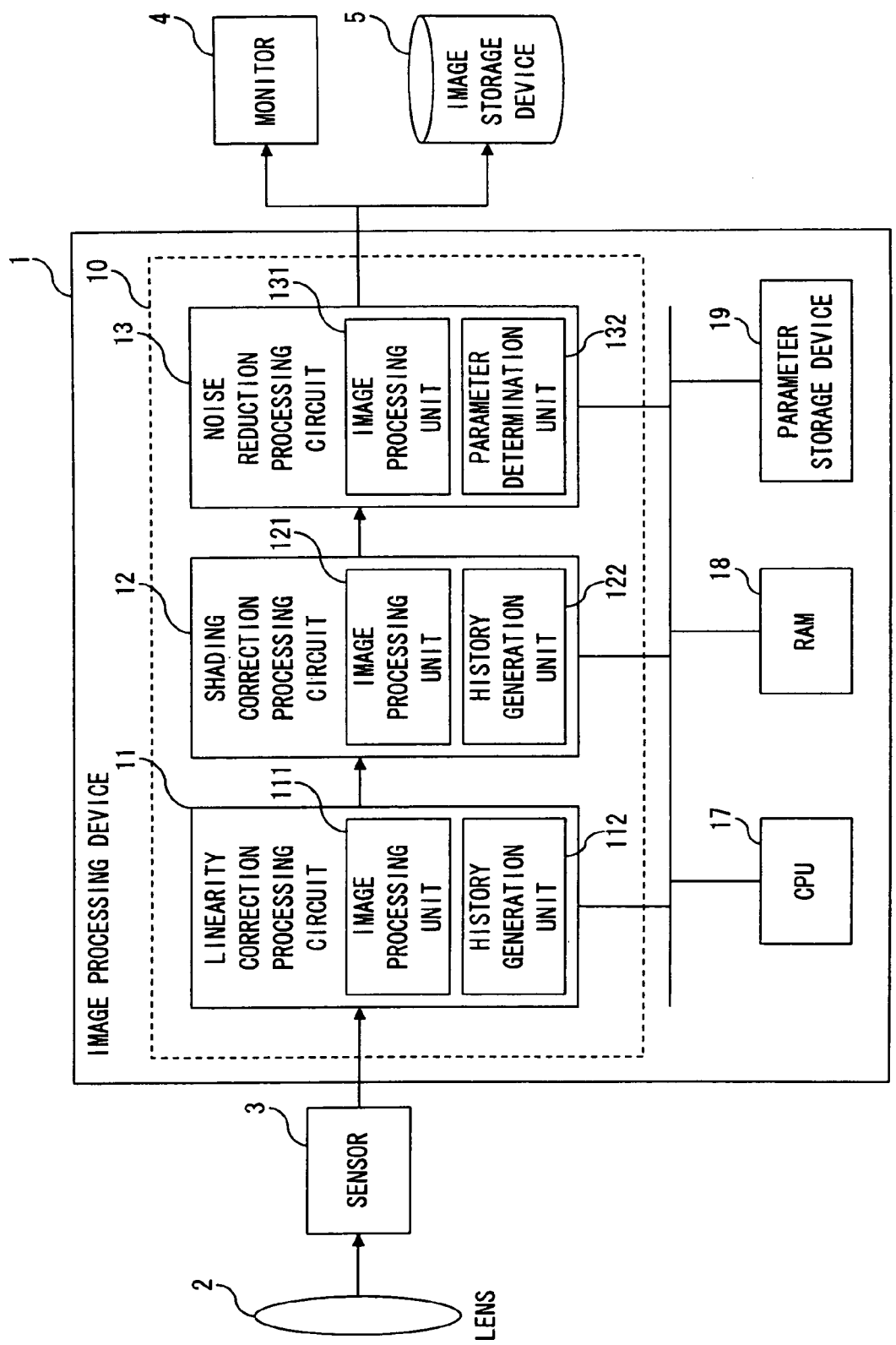
FIG. 1 is a block diagram showing an image processing device according to a first exemplary embodiment of the present invention.

First, an image processing device according to a first exemplary embodiment of the present invention is described with reference to FIG. 1. Note that this first exemplary embodiment shows an example in the case of applying an image processing device to a digital camera.

A digital camera includes an image processing device 1, a lens 2, a sensor 3, a monitor 4 and an image storage device 5.

The image processing device 1 includes a linearity correction processing circuit 11, a shading correction processing circuit 12, a noise reduction processing circuit 13, a CPU (Central Processing Unit) 17, a RAM (Random Access Memory) 18, and a parameter storage device 19. Note that an image processing pipeline 10 includes the linearity correction processing circuit 11, the shading correction processing circuit 12, and the noise reduction processing circuit 13. Further, the processing circuits 11 to 13, the CPU 17, the RAM 18 and the parameter storage device 19 are connected to each other by a bus, for example.

The linearity correction processing circuit 11 executes the image correction processing to recover the linearity of pixel values included in an image according to the characteristic of the sensor 3. The linearity correction processing circuit 11 includes an image processing unit 111 and a history generation unit 112.

The image processing unit 111 multiplies an input pixel value by a coefficient according to the input pixel value. Note that the image processing unit 111 identifies the coefficient according to a linearity correction processing specification parameter specified by the CPU 17. The linearity correction processing specification parameter indicates the degree of the linearity correction.

The history generation unit 112 generates information based on the correction multiplied to the pixel value as a processing history.

The shading correction processing circuit 12 executes the image correction processing to even out the density of an image generated by the characteristic of the lens 2. The shading correction processing circuit 12 includes an image processing unit 121 and a history generation unit 122.

The image processing unit 121 multiplies an input pixel value by the coefficient determined for each of the x- and y-coordinates positions of pixels included in an image. Note that the image processing unit 121 identifies the coefficient according to the shading correction processing specification parameter specified by the CPU 17. The shading correction processing specification parameter indicates the degree of the shading correction.

The history generation unit 122 generates information based on the correction multiplied to a pixel value as a processing history.

The noise reduction processing circuit 13 executes the image processing to reduce the noise of an image. The noise reduction processing circuit 13 includes an image processing unit 131 and a parameter determination unit 132.

The image processing unit 131 calculates each pixel value that is obtained by reducing the noise from the input pixel value by the strength suited for the input pixel value. Note that the image processing unit 131 identifies the strength, by which the noise is reduced, according to a parameter input from the parameter determination unit 132. This parameter is obtained by adjusting a noise reduction processing specification parameter according to the specifics of image processing at the preceding stage.

The parameter determination unit 132 determines a parameter suited for each of the input pixel values according to the noise reduction processing specification parameter specified by the CPU 17 and input history information. The noise reduction processing specification parameter indicates the degree of the noise reduction processing.

The CPU 17 controls each of the processing circuits 11 to 13 including the start and stop of operation. The CPU 17 obtains a parameter to specify to each of the processing circuits 11 to 13 from the parameter storage device 19, and specifies the obtained parameter to each of the processing circuits 11 to 13.

The RAM 18 stores information for the operation of the CPU 17 and the control of each of the processing circuits 11 to 13.

The parameter storage device 19 stores parameters that are specified for each of the processing circuits 11 to 13. The parameter storage device 19 is, for example, a storage device such as a flash memory or HDD (Hard Disk Drive). The parameter storage device 19 stores parameters for a moving image and parameters for a still image, for example.

The lens 2 is an optical lens that focuses a light from an object, and forms an image on the sensor 3.

The sensor 3 is a photoelectric device that converts an optical image formed by the lens 2 into an electric signal. The sensor 3 includes, for example, a semiconductor device such as a CCD (Charge Coupled Device) image sensor or CMOS (Complementary Metal Oxide Semiconductor) image sensor. The sensor 3 generates information representing a taken image by the conversion. The information representing an image includes the pixel value of each pixel included in the image, and information indicating the x- and y-coordinates positions when x- and y-coordinates are used for the image.

The monitor 4 displays an image obtained by executing the image processing by the image processing pipeline 10. The monitor 4 is, for example, a display device such as a LCD (Liquid Crystal Display), Organic EL (Electro Luminescence) or PDP (Plasma Display Panel).

The image storage device 5 stores information representing an image obtained by the image processing. The image storage device 5 is, for example, a SD (Secure Digital) memory card, a SDHC (SD High Capacity) memory card or SDXC (SD eXtended Capacity) memory card.

Figure 2:
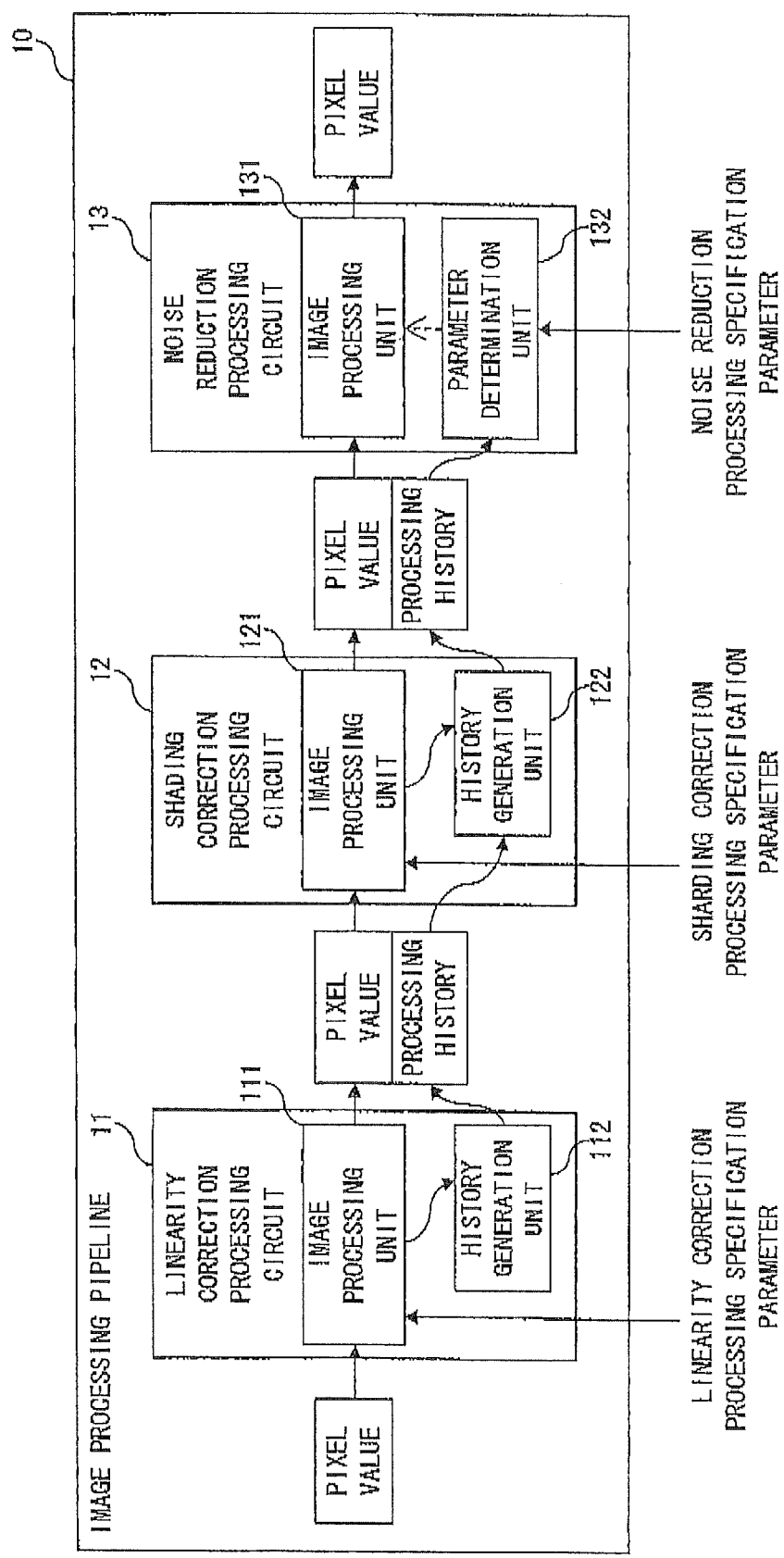
FIG. 2 is a diagram showing an image processing pipeline of an image processing device according to a first exemplary embodiment of the present invention.

Next, an operation of the image processing device according to the first exemplary embodiment of the present invention is described with reference to FIG. 1 and FIG. 2. FIG. 2 is a diagram showing an image processing pipeline of an image processing device according to the first exemplary embodiment of the present invention.

First, when an image of an object is taken, the sensor 3 converts an optical image formed by the lens 2 into an electric signal, and generates information representing a taken image. Then, the sensor 3 outputs a pixel value included in this image to the linearity correction processing circuit 11.

Moreover, the CPU 17 obtains a parameter for a moving image or parameters for a still image from the parameter storage device 19 according to the taken image, and stores the obtained parameter in the RAM 18. Note that the parameter for a moving image or parameter for a still image has a predetermined arbitrarily value.

Note that the CPU 17 obtains the linearity correction processing specification parameter that will be specified for the linearity correction processing circuit 11, the shading correction processing specification parameter that will be specified for the shading correction processing circuit 12 and the noise reduction processing specification parameter that will be specified for the noise reduction processing circuit 13 from the parameter storage device 19, and stores the obtained parameters in the RAM 18.

Then, the CPU 17 specifies the parameter for each of the processing circuit 11 to 13 by outputting each parameter stored in the RAM 18 to each of the processing circuit 11 to 13.

The image processing unit 111 of the linearity correction processing circuit 11 multiplies an input pixel value input from the sensor 3 by the coefficient according to the input pixel value based on the linearity correction processing specification parameter input from the CPU 17. Then, the image processing unit 111 outputs the output pixel value obtained by multiplying the input pixel value by the coefficient to the shading correction processing circuit 12.

The image processing executed by the image processing unit 111 can be expressed by formula (1). Note that in formula (1), "in(x, y)" represents an input pixel value, "f(val)" represents an input-output response function of the linearity correction processing determined by the linearity correction processing specification parameter, and "out(x, y)" represents an output pixel value.

$$\mathrm{out}(x,y) = f(\mathrm{in}(x,y)) \qquad (1)$$

Figure 3:
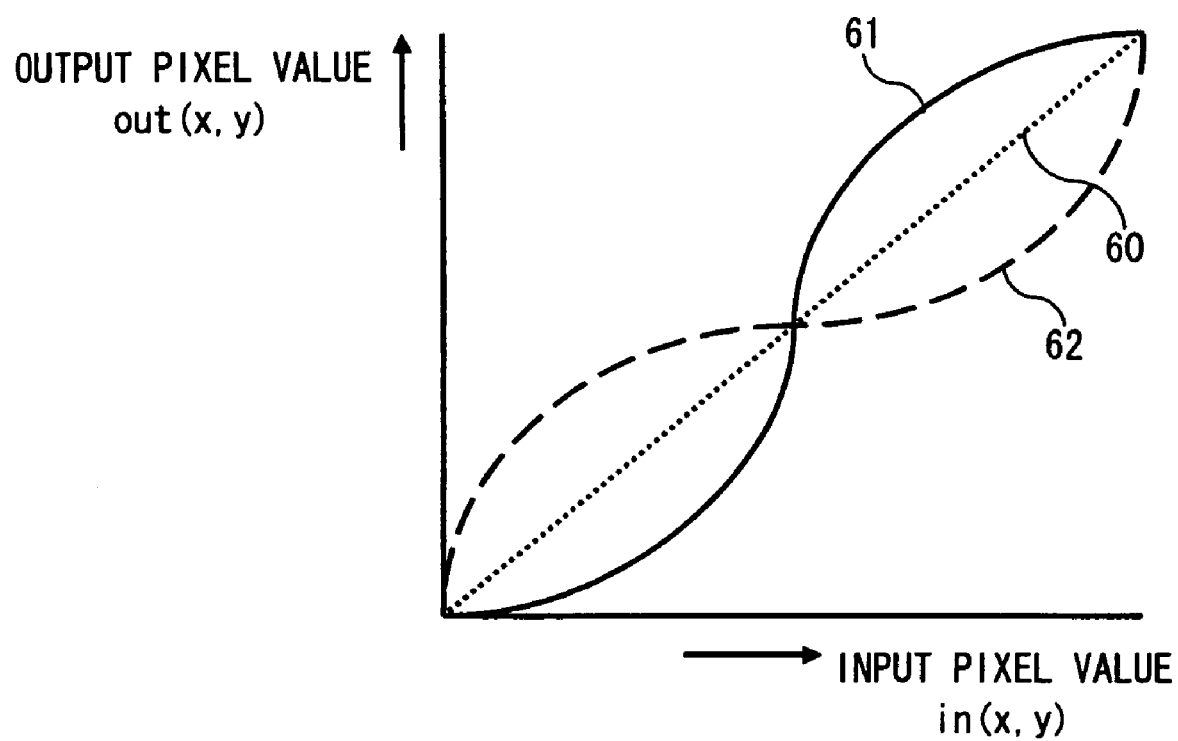
FIG. 3 is a diagram for explaining a linearity correction processing according to a first exemplary embodiment of the present invention.

Moreover, the input-output response function "f(val)" can be expressed as the function 61 shown in FIG. 3 as an example. For example, when the sensor 3 has such a characteristic that pixel values are calculated with a nonlinearity as shown as the function 62, a linearity correction processing specification parameter is specified for the linearity correction processing circuit 11 so that the input-output response function "f(val)" of the linearity correction processing that can be expressed as the function 61 having the exactly opposite characteristic to the function 62 can be determined. The image processing unit 111 determines a coefficient according to an input pixel value based on the input-output response function "f(val)". Then, the image processing unit 111 corrects the input pixel value to obtain the pixel value, for which the linearity lost due to the characteristic of the sensor 3 is recovered, as the function 60 by multiplying the input pixel value by the determined coefficient.

Then, the history generation unit 112 of the linearity correction processing circuit 11 generates information based on the coefficient multiplied to the pixel value as processing history. The history generation unit 112 associates the generated processing history with the output pixel value, and outputs the generated processing history to the shading correction processing circuit 12.

Note that the processing history generated by the history generation unit 112 can be expressed by formula (2). "INT (val)" is a function of rounding val down to the nearest integer.

$$\text{processing history}(x,y) = \text{INT}(\log_2 \text{out}(x,y)) - \text{INT}(\log_2 \text{in}(x,y)) \quad (2)$$

As shown in formula (2), the value of the difference between the integral part of the logarithm of the output pixel value and the integral part of the logarithm of the input pixel value is used as the processing history. In this way, it is possible to know the increase degree of the pixel value in the linearity correction processing circuit 11 based on the processing history.

Next, the image processing unit 121 of the shading correction processing circuit 12 multiplies the input pixel value input by the linearity correction processing circuit 11 by the coefficient identified for each of the x- and y-coordinates positions of pixels by the shading correction processing specification parameter input from the CPU 17. Then, the image processing unit 121 outputs the output pixel value obtained by multiplying the input pixel value and the coefficient to noise reduction processing circuit 13.

The image processing executed by the image processing unit 121 can be expressed by formula (3). Note that in formula (3), "in(x, y)" represents an input pixel value, "a(val)" represents an input-output response function of the shading correction processing determined by the shading correction processing specification parameter, and "out(x, y)" represents an output pixel value.

$$\text{out}(x,y) = a(x,y) \times \text{in}(x,y) \quad (3)$$

Note that the input-output response function "a(val)" is a value that is determined in advance to even out the density of an image generated by the characteristic of the lens 2 for each of the x- and y-coordinates positions of pixels. The image processing unit 121 multiplies the input pixel value "in(x, y)" by the value of the input-output response function "a(x, y)" of the shading correction processing corresponding to the x- and y-coordinates position of the input pixel. This enables the density of an image generated by the characteristic of the lens 2 to be evened out. That is, the shading correction processing circuit 12 receives the input pixel value and the information indicating the x- and y-coordinates position of the input pixel. The sensor 3 and each of the processing circuits 11 to 13 associate this information with the pixel value and output them, thus enabling each of the processing circuits 11 to 13 to obtain this information.

Then, the history generation unit 122 of the shading correction processing circuit 12 generates information based on the coefficient multiplied to the pixel value as processing history. The history generation unit 122 associates the generated processing history with the output pixel value, and outputs the generated processing history to the noise reduction processing circuit 13.

Note that the processing history generated by the history generation unit 122 can be expressed by formula (4). Note that in formula (4), "processing history of preceding stage (x, y)" represents a processing history output from the linearity correction processing circuit 11 of the preceding stage.

$$\text{processing history}(x,y) = \text{INT}(\log_2 a(x,y)) + \text{processing history of preceding stage}(x,y) \quad (4)$$

As shown in formula (4), the value obtained by adding the integral part of the logarithm of the input-output response function "a(x, y)" of the shading correction processing and the processing history output from the linearity correction processing circuit 11 is used as the processing history. In this way, it is possible to know the increase degree of the pixel value in the linearity correction processing circuit 11 and the shading correction processing circuit 12 based on the processing history.

Next, the image processing unit 131 of the noise reduction processing circuit 13 executes the noise reduction processing to calculate a pixel value that is obtained by reducing the noise from the input pixel value by the strength suited for the input pixel value input from the shading correction processing circuit 12 according to the parameter input from the parameter determination unit 132. Then, the image processing unit 131 outputs the output pixel value calculated by the noise reduction processing to the monitor 4 and the image storage device 5.

The image processing executed by the image processing unit 131 can be expressed by formula (5). Note that in formula (5), "in(x, y)" represents an input pixel value, "s+coefficient*processing history of preceding stage (x, y)" represents the noise reduction strength parameter indicating the strength of the noise reduction processing, "s" represents the noise reduction processing specification parameter, and "processing history of preceding stage (x, y)" represents the processing history output from the shading correction processing circuit 12 of the preceding stage.

$$\text{out}(x,y) = \text{noise reduction processing}(\text{in}(x,y), s + \text{coefficient} \times \text{processing history of preceding stage}(x,y)) \quad (5)$$

That is, the parameter determination unit 132 calculates the value by adding the noise reduction processing specification parameter input from the CPU 17 and the value obtained by multiplying by the predetermined coefficient by the processing history input from the shading correction processing circuit 12. The parameter determination unit 132 outputs the calculated value to the image processing unit 131 as the noise reduction strength parameter. Note that the value of "coefficient" shown in the formula (5) can be a predetermined arbitrarily value. For example, the "coefficient" may be stored in a storage device such as a register included in the noise reduction processing circuit 13. Alternatively, the "coefficient" may be stored in the parameter storage device 19, and the CPU 17 may obtain the "coefficient" from the parameter storage device 19 and outputs the "coefficient" to the noise reduction processing circuit 13.

Figure 4:
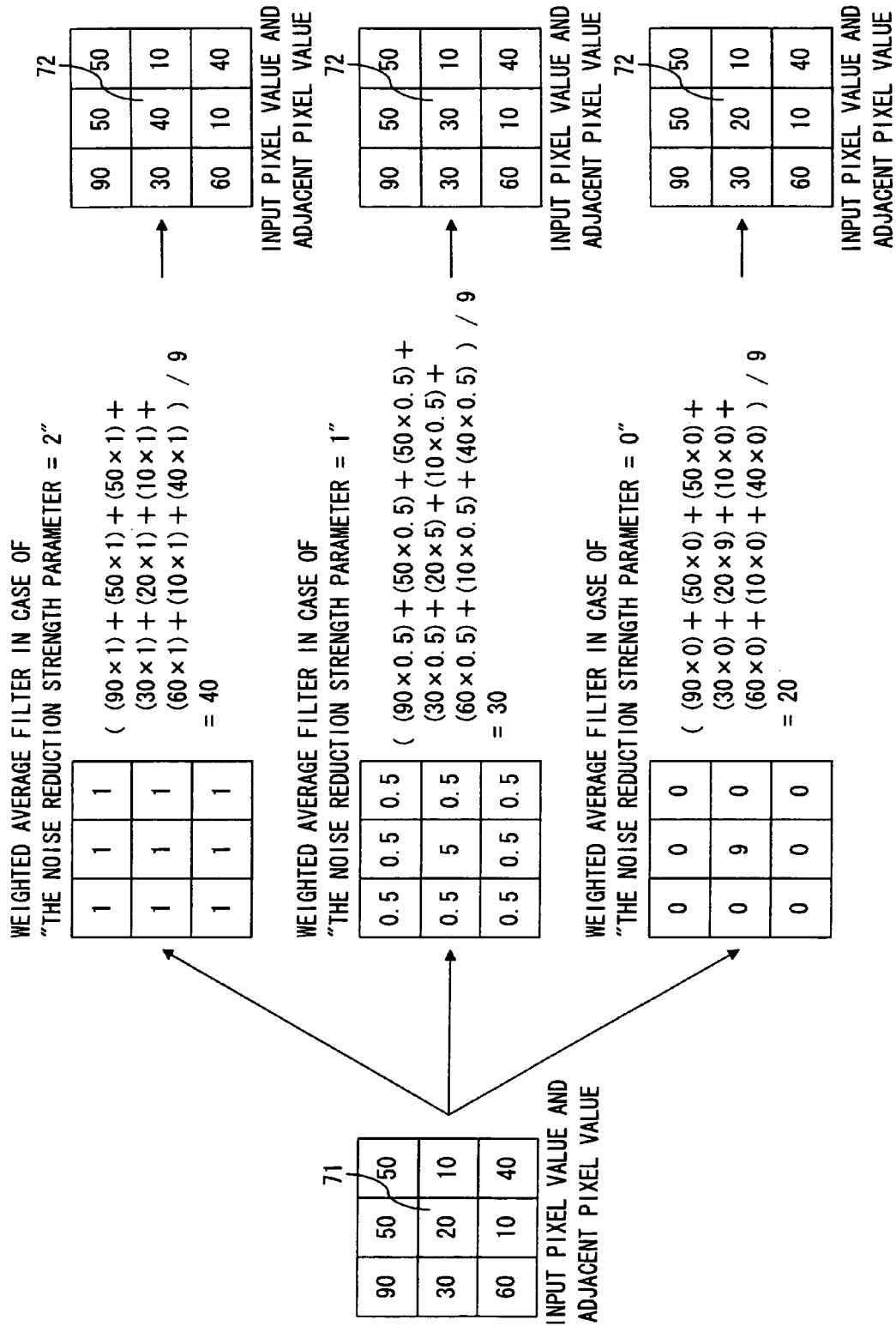
FIG. 4 is a diagram for explaining a noise reduction correction processing according to a first exemplary embodiment of the present invention.

FIG. 4 illustrates the details of the noise reduction processing of the image processing unit 131. As shown in FIG. 4, the image processing unit 131 calculates the weight average value of the input pixel value 71 and the pixel values of the pixels adjacent to the input pixel, which is indicated by the input pixel value 71, as the output pixel value 72 by the weight average filter. That is, the noise reduction processing circuit 13 receives the input pixel value and the pixel value of the adjacent pixel, and then executes the noise reduction processing. Note that the pixel value of the adjacent pixel may be input in advance, may be input with the input pixel value, or may be input in any other way.

The noise reduction strength parameter is the value used to assign weights to the input pixel value and the adjacent pixel value in the weight average filter. As shown in FIG. 4, the weight of the adjacent pixel value with respect to the input pixel value increases as the noise reduction strength parameter increases. Consequently, the strength of the noise reduction processing increases as the noise reduction strength parameter increases. The noise reduction strength parameter is the value obtained by adding the noise reduction processing specification parameter and the value of the input processing history. Therefore, the strength to reduce the noise increases in proportion to the value of the input processing history.

As described above, it is possible to adjust the strength of the noise reduction processing according to the degree of increase of a pixel value in the linearity correction processing circuit 11 and the shading correction processing circuit 12. In other words, it is possible to execute the strong noise reduction processing for a pixel having an increased pixel value and thus strengthened noise in the linearity correction processing circuit 11 and the shading correction processing circuit 12 according to its strength, while the weak noise reduction processing is executed on a pixel having the non-increased pixel value and non-strengthened noise in the linearity correction processing circuit 11 and the shading correction processing circuit 12 according to its strength. In this way, it is possible to prevent that a pixel having non-strengthened noise is processed with the noise reduction processing with more strength than necessary, and that the image quality of the pixel having non-strengthened noise is degraded. Additionally, it is also possible to prevent that a pixel having strengthened noise is not processed with the noise reduction processing with necessary strength, and that the noise remains in the pixel having strengthened noise.

Next, the monitor 4 outputs the image based on the pixel value input from the noise reduction processing circuit 13.

Also, the image storage device 5 stores the information representing the image based on the pixel values input from the noise reduction processing circuit 13.

As explained above, in this first exemplary embodiment, it is possible to know the specifics of the image processing executed on a pixel to be processed with a noise reduction processing according to a processing history. Accordingly, it is possible to execute the noise reduction processing with the strength according to the specifics of the image processing executed on a pixel to be processed in the noise reduction processing using the image processing pipeline. As a result, it is possible to improve the image quality of the image generated by the noise reduction processing.

That is, this first exemplary embodiment can execute image processing at the subsequent stage according to the specifics of image processing at the preceding stage. As a result, it is possible to improve the image quality of an image generated by the image processing using the image processing pipeline.

Second Exemplary Embodiment

Figure 5:
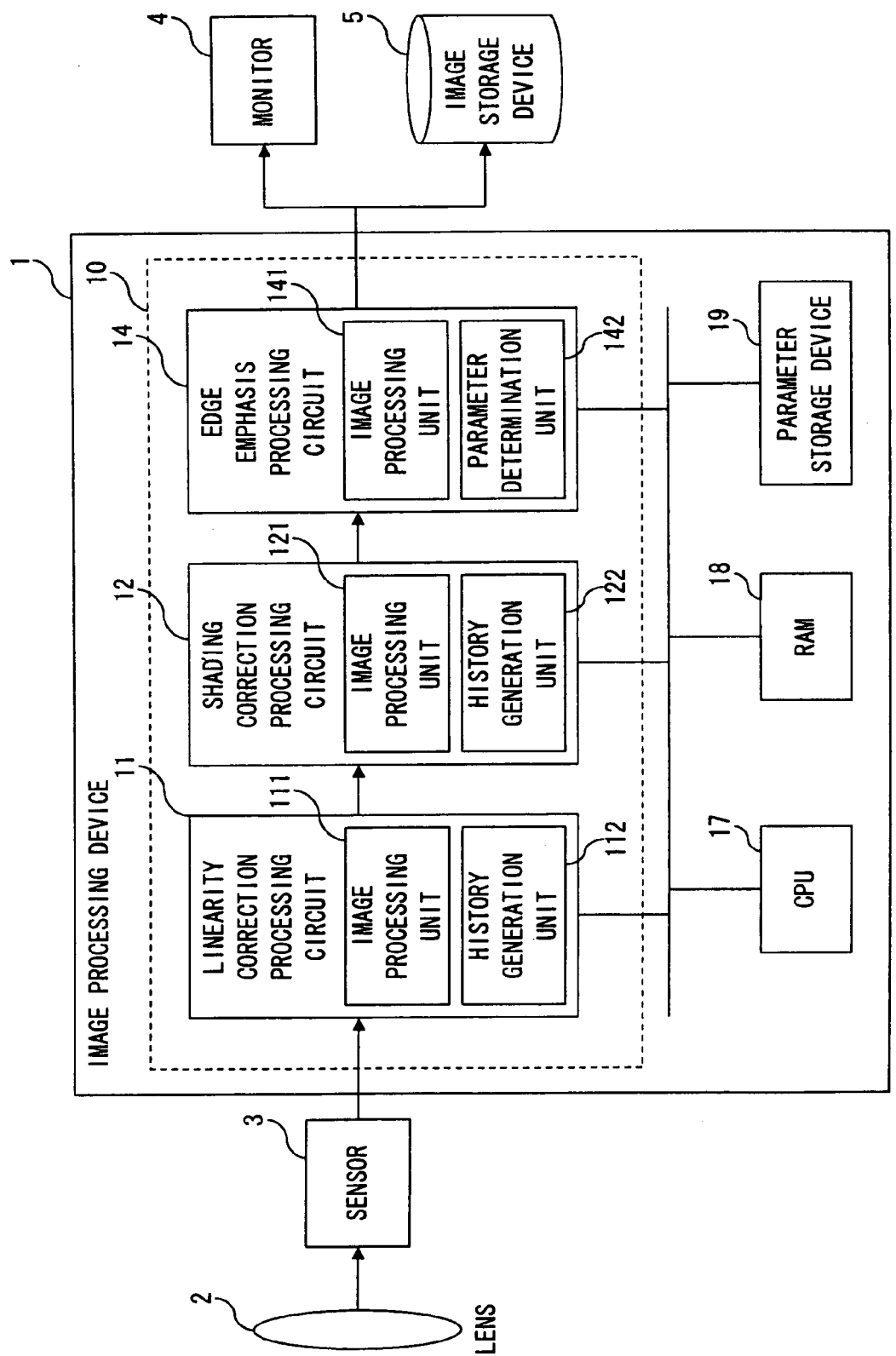
FIG. 5 is a block diagram showing an image processing device according to a second exemplary embodiment of the present invention.

Next, an image processing device according to the second exemplary embodiment of the present invention is described with reference to FIG. 5. FIG. 5 is a block diagram showing an image processing device according to a second exemplary embodiment of the present invention. Note that this second exemplary embodiment describes an example in the case of applying an image processing device to a digital camera as with the first exemplary embodiment.

The image processing device according to the second exemplary embodiment differs from the first exemplary embodiment in that the noise reduction processing circuit 13 is not included but the edge emphasis processing circuit 14 is included in the image processing device. Note that the description of the same constituent elements as the first exemplary embodiment is omitted.

The edge emphasis processing circuit 14 executes the image processing to emphasize the edge of the image. The edge emphasis processing circuit 14 includes an image processing unit 141 and a parameter determination unit 142.

The image processing unit 141 calculates, for each input pixel value, a pixel value for which the edge is emphasized from the original input pixel value by the strength suited for the original input pixel value. Note that the image processing unit 141 identifies the strength by which the edge is emphasized according to a parameter input from the parameter determination unit 142.

The parameter determination unit 142 determines a parameter suited for each of the input pixel values according to the edge emphasis processing specification parameter specified by the CPU 17 and input history information.

Figure 6:
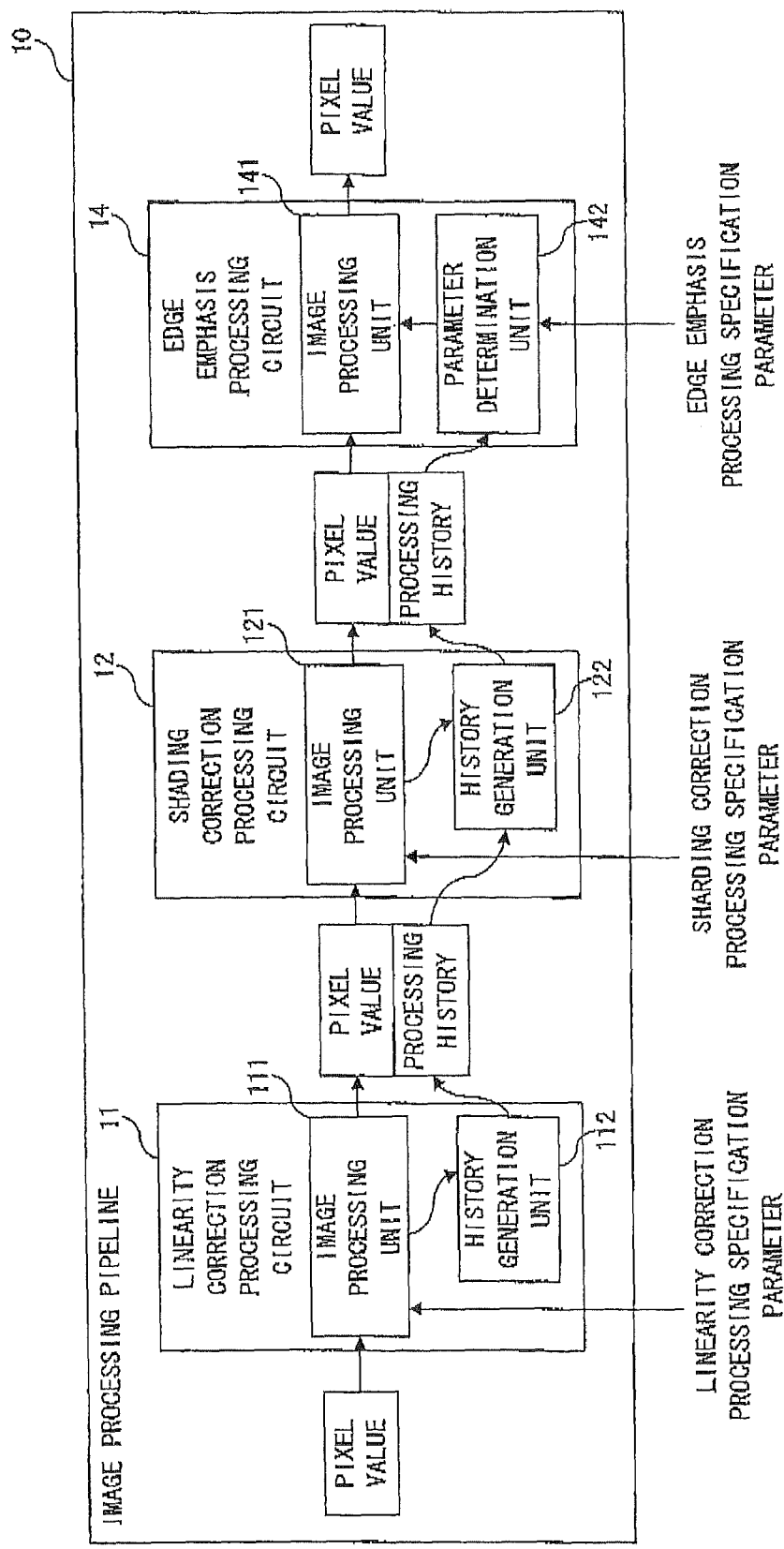
FIG. 6 is a diagram showing an image processing pipeline of an image processing device according to a second exemplary embodiment of the present invention.

Next, an operation of the image processing device according to the second exemplary embodiment of the present invention is described with reference to FIG. 5 and FIG. 6. FIG. 6 is a diagram showing an image processing pipeline of an image processing device according to the second exemplary embodiment of the present invention. Note that similar operation to the first exemplary embodiment is not explained.

The operation from when an image of an object is taken to when the shading correction processing circuit 12 executes image processing differs from the first exemplary embodiment in that the CPU 17 does not obtain the noise reduction processing specification parameter, and that the CPU 17 obtains and restores the edge emphasis processing specification parameter in the RAM 18, and outputs the edge emphasis processing specification parameter restored in the RAM 18 to the edge emphasis processing circuit 14. However, other operations are the same as the first exemplary embodiment, and therefore the explanation is omitted. Further, in the second exemplary embodiment, the shading correction processing circuit 12 outputs the calculated output pixel value to the edge emphasis processing circuit 14.

The image processing unit 141 of the edge emphasis processing circuit 14 execute the edge emphasis processing to calculate a pixel value for which the edge is emphasized from the input pixel value with the strength suited for the input pixel value input from the shading correction processing circuit 12 according to the parameter input from the parameter determination unit 142. Then, the image processing unit 141 outputs the output pixel value calculated by the edge emphasis processing to the monitor 4 and the image storage device 5.

The image processing executed by the image processing unit 141 can be expressed by formula (6). Note that in formula (6), "in(x, y)" represents an input pixel value, "s−coefficient*processing history of preceding stage (x, y)" represents the edge emphasis strength parameter indicating the strength of the edge emphasis processing, "s" represents the edge emphasis processing specification parameter, and "processing history of preceding stage (x, y)" represents the processing history outputted from the shading correction processing circuit 12 of the preceding stage.

$$\text{out}(x,y) = \text{edge emphasis processing}(\text{in}(x,y), s - \text{coefficient} \times \text{processing history of preceding stage}(x,y)) \quad (6)$$

That is, the parameter determination unit 142 calculates the value that is obtained by subtracting the value obtained by multiplying the predetermined coefficient by the processing history input from the shading correction processing circuit 12 from the edge emphasis processing specification parameter input from the CPU 17. The parameter determination unit 142 outputs the calculated value to the image processing unit 141 as the edge emphasis strength parameter. Note that the value of "coefficient" shown in the formula (6) can be a predetermined arbitrarily value. For example, the "coefficient" may be stored in a storage device such as a register included in the edge emphasis processing circuit 14. Alternatively, the "coefficient" may be stored in the parameter storage device 19, and the CPU 17 may obtain the "coefficient" from the parameter storage device 19 and outputs the "coefficient" to the edge emphasis processing circuit 14.

Figure 7:
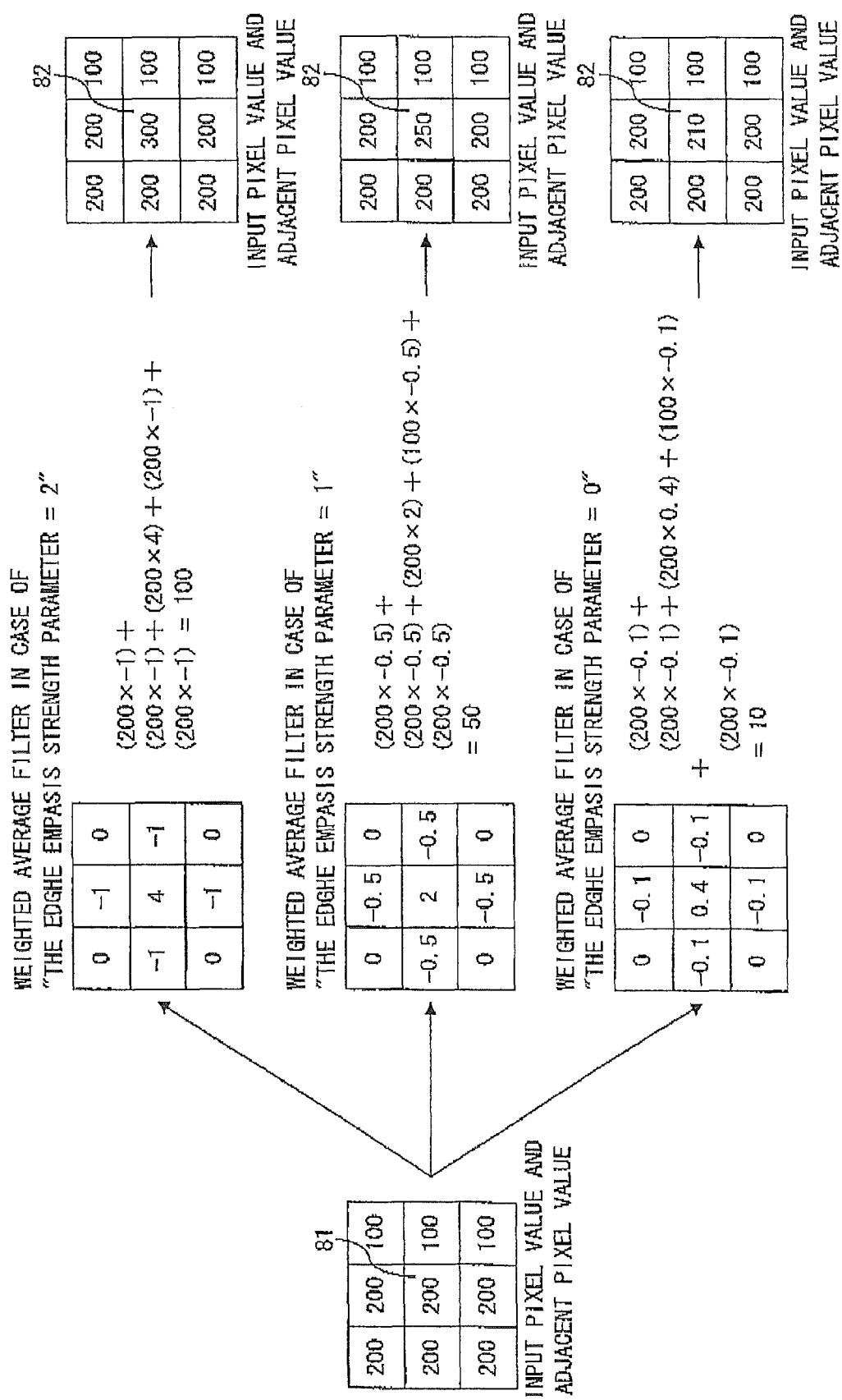
FIG. 7 is a diagram for explaining an edge emphasis processing according to a second exemplary embodiment of the present invention.

FIG. 7 illustrates the details of the edge emphasis processing of the image processing unit 141. As shown in FIG. 7, the image processing unit 141 calculates the sum total of the pixel values obtained by applying a weight to the pixel value of each of the input pixel value 81 and the pixels adjacent to the input pixel, which is indicated by the input pixel value 81, by the edge detection filter. Then, the image processing unit 141 detects the edge by determining whether the absolute value of the calculated sum total is larger than the predetermined threshold value or not.

If the absolute value of the calculated sum total is larger than the predetermined threshold value, the image processing unit 141 determines that the input pixel is the edge, and calculates the pixel value obtained by adding the calculated sum total and the input pixel value 81 as the output pixel value 82.

If the absolute value of the calculated sum total is not larger than the predetermined threshold value, the image processing unit 141 determines that the input pixel is not the edge, and the input pixel value is used as the output pixel value without performing any additional calculation.

Note that this description is made on the assumption that the threshold value is smaller than 10. Further, the threshold value may be a predetermined arbitrarily value. For example, the threshold value may be stored in a storage device such as a register included in the edge emphasis processing circuit 14. Alternatively, the threshold value may be stored in the parameter storage device 19, and the CPU 17 may obtain the threshold value from the parameter storage device 19 and outputs the threshold value to the edge emphasis processing circuit 14.

The edge emphasis strength parameter is the value used to assign weights to the input pixel value and the adjacent pixel value in the edge emphasis filter. As shown in FIG. 7, the weight of the adjacent pixel value and the input pixel value increase as the edge emphasis strength parameter increases. Consequently, the strength of the edge emphasis processing increases as the edge emphasis strength parameter increases. The edge emphasis strength parameter is the value obtained by subtracting the value of the input processing history from the edge emphasis processing specification parameter. Therefore, the strength by which the edge is emphasized decreases in proportion to the value of the input processing history.

As described above, it is possible to adjust the strength of the edge emphasis processing according to the degree of increase of a pixel value in the linearity correction processing circuit 11 and the shading correction processing circuit 12. In other words, it is possible to execute the weak edge emphasis processing for a pixel having an increased pixel value and thus strengthened noise in the linearity correction processing circuit 11 and the shading correction processing circuit 12 according to its strength, while the strong noise reduction processing is executed on a pixel having the non-increased pixel value and non-strengthened noise in the linearity correction processing circuit 11 and the shading correction processing circuit 12 according to its strength. In this way, it is possible to prevent such a situation that the pixel having strengthened noise cannot be differentiated from the edge and the noise is thereby emphasized.

Note that the operation of the monitor 4 and the image storage device 5 performed when the pixel value is input from the edge emphasis processing circuit 14 is the same as the first exemplary embodiment, and therefore the explanation is omitted.

As explained above, in this second exemplary embodiment, it is possible to know the specifics of the image processing executed on a pixel for which an edge emphasis processing is to be executed according to a processing history. Accordingly, it is possible to execute the edge emphasis processing with the strength according to the specifics of the image processing executed on the pixel for which the image processing is to be executed in the edge emphasis processing using the image processing pipeline. As a result, it is possible to improve the image quality of the image generated by the edge emphasis processing.

That is, this second exemplary embodiment can execute image processing as the subsequent stage according to the specifics image processing at the preceding stage. As a result, it is possible to improve the image quality of an image generated by the image processing using the image processing pipeline.

Third Exemplary Embodiment

Figure 8:
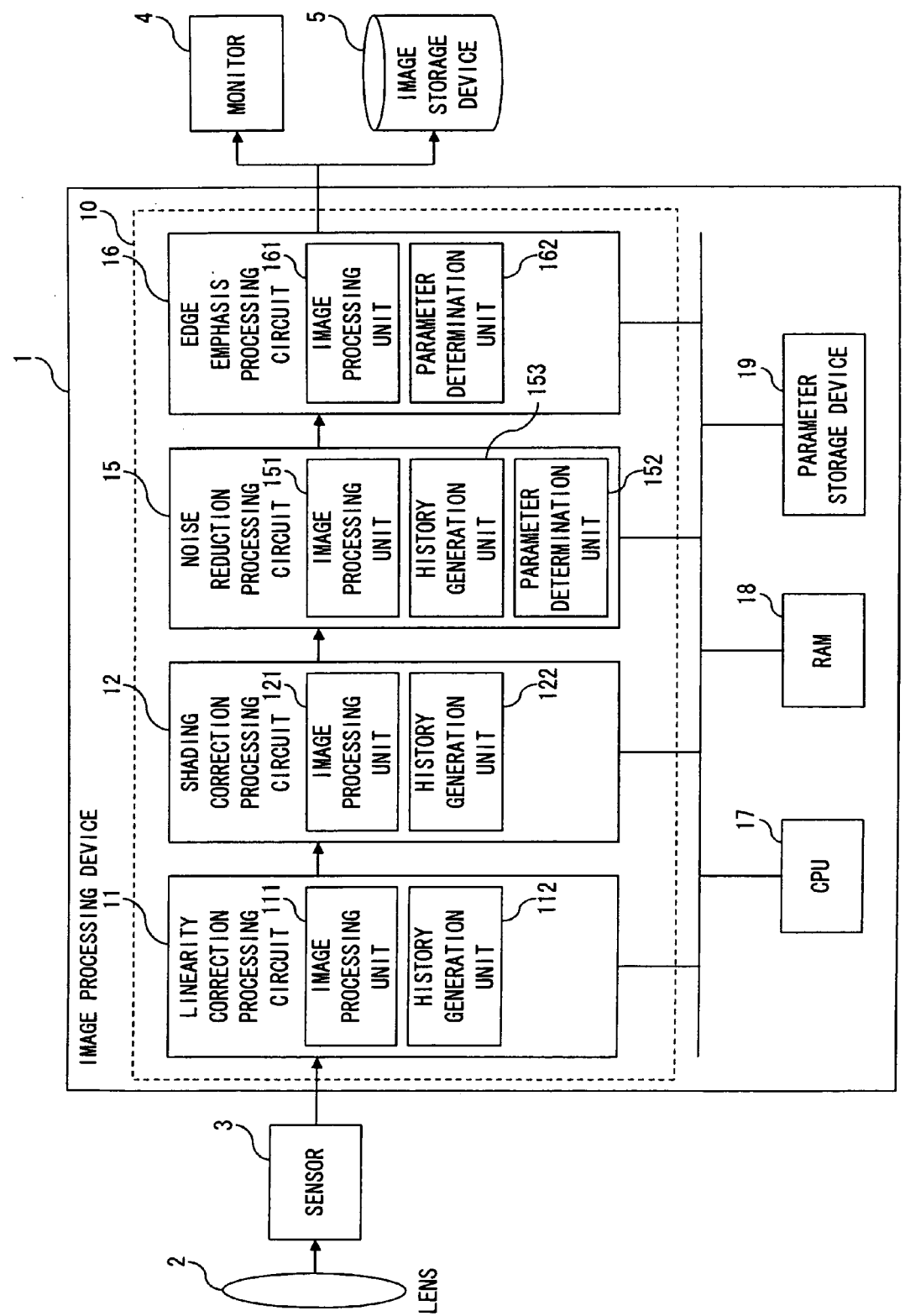
FIG. 8 is a block diagram showing an image processing device according to a third exemplary embodiment of the present invention.

Next, an image processing device according to the third exemplary embodiment of the present invention is described with reference to FIG. 8. FIG. 8 is a block diagram showing an image processing device according to a third exemplary embodiment of the present invention. Note that, this third exemplary embodiment describes an example in the case of applying an image processing device to a digital camera as with the first exemplary embodiment and the second exemplary embodiment.

The image processing device according to the third exemplary embodiment differs from the first exemplary embodiment and the second exemplary embodiment in that the noise reduction processing circuit 15 and the edge emphasis processing circuit 16 is included. Note that, the description of the same constituent elements as the first exemplary embodiment and the second exemplary embodiment is omitted.

The image processing unit 151 of the noise reduction processing circuit 15 differs from the image processing unit 131 of the noise reduction processing circuit 13 of the first exemplary embodiment in that the image processing unit 151 determines whether an input pixel input from the shading correction processing circuit 12 is the edge or not. Then, if the input pixel is the edge, the image processing unit 151 does not execute the noise reduction processing. If the input pixel is not the edge, the image processing unit 151 executes the noise reduction processing. However, the other operations are the same as the first exemplary embodiment.

As described above, it is possible to prevent the edge from being collapsed by preventing the execution of the noise reduction processing on the pixel located on an edge.

Further, the noise reduction processing circuit 15 differs from the first exemplary embodiment in that the noise reduction processing circuit 15 includes the history generation unit 153. The history generation unit 153 incorporates an edge detection result obtained in the image processing unit 151 into a processing history output from the shading correction processing circuit 12, and outputs the processing history to the edge emphasis processing circuit 16.

The image processing unit 161 of the edge emphasis processing circuit 16 differs from the image processing unit 141 of the edge emphasis processing circuit 14 of the second exemplary embodiment in that the image processing unit 161 executes the edge emphasis processing based on the edge detection result included in the processing history. However, the other operations are the same as the second exemplary embodiment.

Figure 9:
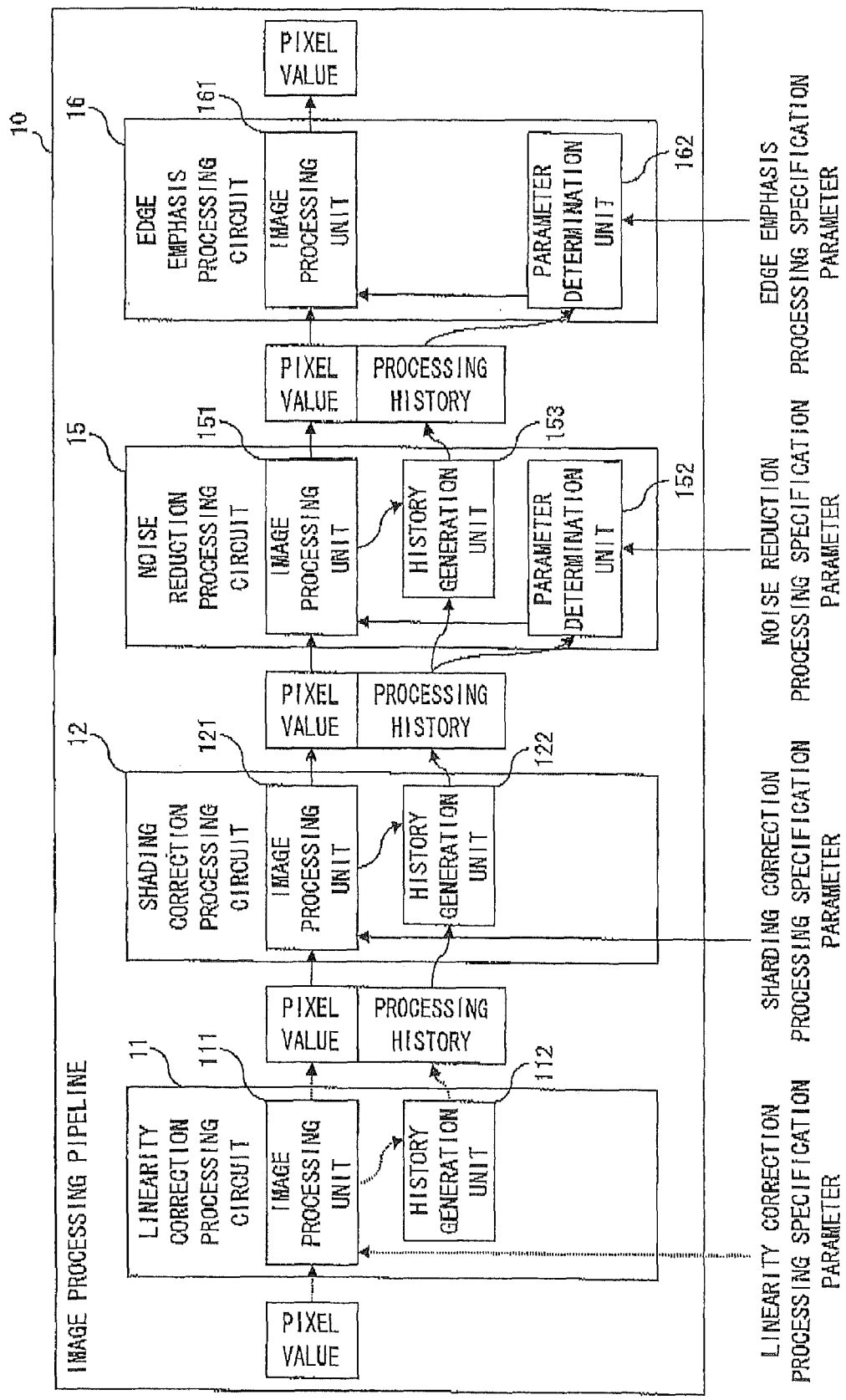
FIG. 9 is a diagram showing an image processing pipeline of an image processing device according to a third exemplary embodiment of the present invention.
Figure 10:
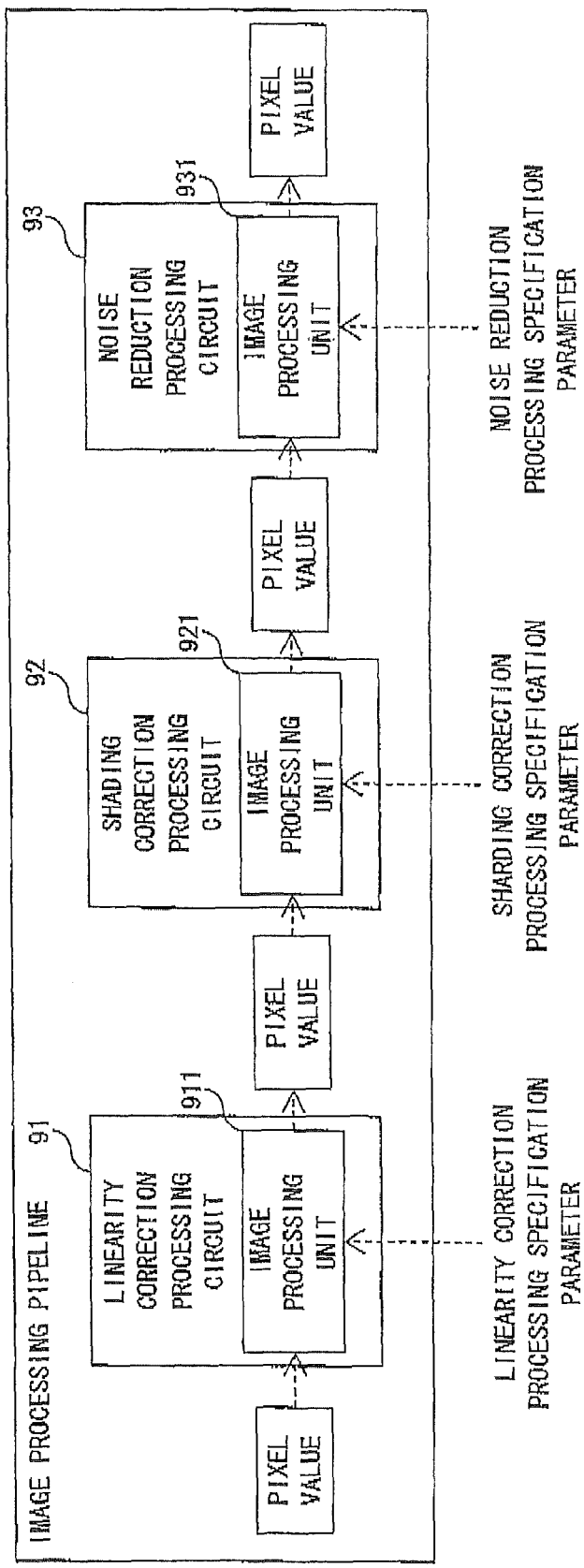
FIG. 10 is a diagram showing an example of an image processing pipeline.

Next, an operation of the image processing device according to the third exemplary embodiment of the present invention is described with reference to FIG. 8 and FIG. 9. FIG. 9 is a diagram showing an image processing pipeline of an image processing device according to the third exemplary embodiment of the present invention. Note that similar operation to the first exemplary embodiment and the second exemplary embodiment is not explained.

The operation from when an image of an object is taken to when the shading correction processing circuit 12 executes image processing differs from the first exemplary embodiment and second exemplary embodiment in that the CPU 17 obtains and restores the noise reduction processing specification parameter and the edge emphasis processing specification parameter in the RAM 18, and outputs the noise reduction processing specification parameter restored in the RAM 18 to the noise reduction processing circuit 15, and outputs the edge emphasis processing specification parameter restored in the RAM 18 to the edge emphasis processing circuit 16. However, other operations are the same as the first exemplary embodiment, are therefore the explanation is omitted.

The image processing unit 151 of the noise reduction processing circuit 15 determines whether an input pixel is located on an edge or not. Note that the image processing unit 151 can determine whether the input pixel is located on the edge or not by detecting the edge by the edge detection filter described with reference to FIG. 4 in the second exemplary embodiment.

If the image processing unit 151 determines that the input pixel is located on the edge, the image processing unit 151 outputs the input pixel value to the edge emphasis processing circuit 16 as the output pixel value to the edge emphasis processing circuit 16 without performing any additional processing.

If the image processing unit 151 determines that the input pixel is not located on the edge, the image processing unit 151 executes the noise reduction processing for the input pixel value in the same manner as the first exemplary embodiment, and outputs the output pixel value calculated by the noise reduction processing to the edge emphasis processing circuit 16.

Further, the image processing unit 151 outputs the edge information indicating that whether the input pixel, that is, the output pixel is located on the edge to the history generation unit 153.

The history generation unit 153 of the noise reduction processing circuit 15 associates the processing history, which is generated by incorporating the edge information output from the image processing unit 151 into the processing history output from the shading correction processing circuit 12, with the output pixel value, and outputs the generated processing history and the output pixel value to the edge emphasis processing circuit 16.

Next, the image processing unit 161 of the edge emphasis processing circuit 16 determines whether an input pixel input from the noise reduction processing circuit 15 is the edge according to the edge information included in the processing history input from the noise reduction processing circuit 15.

If the image processing unit 161 determines that the input pixel is not located on the edge, the image processing unit 161 outputs the input pixel value to the monitor 4 and the image storage device 5 as the output pixel value to the monitor 4 and the image storage device 5 without performing any additional processing.

If the image processing unit 161 determines that the input pixel is located on the edge, the image processing unit 161 outputs the output pixel value obtained by adding the input pixel value to the sum total of the weighted input pixel value and the weighted pixel values of adjacent pixels to the monitor 4 and the image storage device 5.

Note that the operation of the monitor 4 and the image storage device 5 performed when the pixel value is input from the edge emphasis processing circuit 16 is the same as the first exemplary embodiment and the second exemplary embodiment, and therefore the explanation is omitted.

As described above, the incorporation of the edge detection result obtained in the noise reduction processing circuit 15 of the preceding stage into the processing history eliminates the need to execute the edge detection processing in which calculation is performed for each input pixel according to the pixel value and whether the input pixel is located on the edge or not is determined, even when each of the noise reduction processing circuit 15 and the edge emphasis processing circuit 16 needs to detect the edge.

As explained above, this third exemplary embodiment can improve the image quality of the image generated by the noise reduction processing and the edge emphasis processing in the same manner as the first and the second exemplary embodiments.

Furthermore, in this third exemplary embodiment, it is possible to know the edge detection result in the pixel on which the edge emphasis processing is to be executed as the specifics of the image processing according to the processing history. Accordingly, it is possible to know whether the pixel on which the edge emphasis processing is to be executed is located on the edge only by referring to the processing history. As a result, it is possible to eliminate the need to provide the edge detection processing for the pixel on which the edge emphasis processing is to be executed in the edge emphasis processing of the image processing pipeline, and thus resulting in a reduction in the circuit and a reduction in the power consumption.

That is, if image processing steps of a preceding stage and a subsequent stage use the same processing result in the image processing pipeline, this third exemplary embodiment eliminates the need to provide a part or all of this edge detection processing in a subsequent stage. As a result, this results in a reduction in the circuit and a reduction in the power consumption.

The present invention is not limited to the above exemplary embodiment, but can be modified as appropriate within the scope of the present invention.

For example, the number of circuits executing an image processing and the type of the image processing executed in each of circuit is not limited to examples shown in the above exemplary embodiments. An image processing device may include a circuit executing an image correction processing such as a gamma correction or a tone curve correction.

Further, a parameter specified by the CPU for each of processing circuits may be stored in a storage device such as a register included in each of the processing circuits, so that the CPU may not output the parameter to each of the processing circuits.

Further, the processing to determine the specifics of the processing by the processing history can apply to various image processing to execute the image processing with the strength according to the value of the specified parameter as with the noise reduction processing or the edge emphasis processing shown in above exemplary embodiment. That is, the specifics of the image processing executed in each of processing circuit and the processing history are not limited to the formulas (1) to (6) shown in the above exemplary embodiment.

Further, the filter used by an image processing such as noise reduction processing or the edge emphasis processing is not limited to the filters shown in the above exemplary embodiment. That is, the weight specified for the filter can be arbitrarily changed.

Further, in above exemplary embodiment, the integer converted from the logarithm of the input pixel value, the output pixel value or the input-output response function value in the image processing is used for calculating the processing history. However, it is not limited to them. For example, the output pixel value and the input-output response function value may not convert to the integer or the logarithm. That is, these values may be used to calculate the processing history without converting them into integers.

Further, it is not necessary to consistently update a processing history for each of the image processing. For example, in the first exemplary embodiment, the linearity correction processing circuit may generate the processing history, and the shading correction processing circuit may not update the processing history and may output the processing history input from the linearity correction processing circuit to the noise reduction processing circuit without updating it. Alternatively, the linearity correction processing circuit outputs the processing history directly to the noise reduction processing circuit. That is, an image processing at the subsequent stage may be executed based only on the specifics of one image processing among several image processing processes at the preceding stage.

Further, the processing history may be generated for all of the pixels included an image, and may be generated at specific intervals of the x- and y-coordinates positions. Then, if the processing history corresponding to the pixel does not exist, the value interpolated by the processing history of the pixels adjacent to that pixel may be used as the processing history. This suppresses the increase in the amount of data input to and output from the image processing pipeline.

Further, in the second exemplary embodiment, the edge emphasis processing circuit may not determines the presence/absence of an edge, and may calculate the output pixel value by adding the sum total of the input pixel value and the adjacent pixels value to which a weight is applied for all of the input pixel values.

Further, in the third exemplary embodiment, the noise reduction processing circuit may incorporate the sum total of the input pixel value and the adjacent pixels value to which a weight is applied into the processing history, and output this processing history to the edge emphasis processing circuit. Therefore, the edge emphasis processing circuit may be able to emphasize the edge only by adding the sum total included in the processing history to the pixel value of the pixel for which the edge is to be emphasized.

Note that the image processing device according to exemplary embodiments of the present invention can also be configured by supplying a storage medium, which stores a program for implementing the functions of each of processing circuits such as the linearity correction processing circuit, the shading correction processing circuit, the noise reduction processing circuit and the edge emphasis processing circuit of exemplary embodiments of the present invention, to a computer, and by causing a computer or a processor such as a CPU, a MPU (Micro Processing Unit), or a DSP (Digital Signal Processor) included in the system or device to execute the program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the functions according to the above exemplary embodiments can be implemented by causing a computer to execute a program for implementing the functions according to the exemplary embodiments, the functions according to the exemplary embodiments can also be implemented in other ways. For example, the functions according to the exemplary embodiments can be implemented in cooperation with an operating system (OS) or application software running on a computer, in response to an instruction from the program.

Moreover, the functions according to the exemplary embodiments can also be implemented when all or part of the processing for the program is executed by a function enhancement board inserted into a computer or a function enhancement unit connected to a computer.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An image processing device that executes image processing including a first image processing and a second image processing by using a pipeline mechanism, the image processing device comprising:
   a first processing unit that executes the first image processing on an input image data, generates history information recording specifics of processing executed in the first image processing, and outputs the history information to the second first processing unit; and
   a second processing unit that executes the second image processing on the image data obtained in the first image processing according to the output history information, wherein
   the second image processing includes edge emphasis processing to emphasize an edge in the image data,
   the second processing unit emphasizes the edge by a strength determined based on the output history information, the history information includes information indicating a degree of increase a pixel value in the image data, and the second processing unit decreases a strength by which the edge is emphasized as the degree of increase of the pixel value becomes larger.

2. The image processing device according to claim 1, wherein the second image processing includes a noise reduction processing to reduce a noise in the image data, and the second processing unit reduces the noise by a strength determined based on the output history information.

3. The image processing device according to claim 2, wherein the history information includes information indicating a degree of increase of a pixel value in the image data, and the second processing unit increases a strength by which the noise is reduced as the degree of increase of the pixel value becomes larger.

4. The image processing device according to claim 1, wherein the first image processing includes a processing that detects an edge in the image data, and executes image processing on the image data according to a detection result, the history information includes edge information indicating the detection result, the second image processing includes edge emphasis processing to emphasize an edge in the image data, and the second processing unit determines whether the edge is emphasized in the image data or not according to the edge information.

5. The image processing device according to claim 1, wherein the image processing device includes a plurality of first processing units, each of the plurality of the first processing units generates and outputs history information further recording specifics of processing in a first image processing to be executed by that first processing unit itself in addition to the history information output from the first processing unit that executes the first image processing at a preceding stage based on the history information output from the first processing unit, and the second processing unit executes the second image processing according to the history information output from the first processing unit that executes the first image processing at last stage.

6. The image processing device according to claim 1, wherein the image data comprises is data per pixel.

7. The image processing device according to claim 1, wherein each of the first processing unit and the second processing unit is formed from an independent circuit.

8. The image processing device according to claim 1, further comprising a Central Processing unit (CPU) that outputs a first processing specific specification parameter specifying specifics of processing of the first image processing to the first processing unit, and outputs a second processing specific specification parameter specifying specifics of processing of the second image processing to the second processing unit, wherein the first processing unit executes the first image processing according to the first processing specific specification parameter, and the second processing unit executes the second image processing according to the first processing specific specification parameter.

9. An image processing method to execute image processing including a first image processing and a second image processing by a pipeline scheme, the image processing method comprising:

executing the first image processing on image data;

generating and outputting history information recording specifics of processing in the first image processing; and executing the second image processing on the image data obtained in the first image processing according to the output history information, wherein the second image processing includes edge emphasis processing to emphasize an edge in the image data, the second image processing emphasizes the edge by a strength determined based on the output history information, the history information includes information indicating a degree of increase a pixel value in the image data, and the second image processing decreases a strength by which the edge is emphasized as the degree of increase of the pixel value becomes larger.

10. A non-transitory computer readable medium recording an image processing program that causes a processor to execute second image processing among first image processing and second image processing included in image processing executed by a pipeline scheme, the image processing program for causing the processor to execute the processing comprising:

obtaining a history information recording specifics of processing executed on image data in the first image processing; and executing the second image processing on the image data executed in first image processing according to the obtained history information, wherein the second image processing includes edge emphasis processing to emphasize an edge in the image data, the second image processing emphasizes the edge by a strength determined based on the output history information, the history information includes information indicating a degree of increase a pixel value in the image data, and the second image processing decreases a strength by which the edge is emphasized as the degree of increase of the pixel value becomes larger.

* * * * *